US012731091B2

(12) United States Patent
Cecilian, Jr. et al.

(10) Patent No.: US 12,731,091 B2
(45) **Date of Patent: *Sep. 8, 2026**

(54) ANTI-MONOTONY SYSTEM AND METHOD ASSOCIATED WITH NEW HOME CONSTRUCTION IN A MASTER-PLANNED COMMUNITY

(71) Applicant: Cecilian Partners, Inc., New Hope, PA (US)

(72) Inventors: John Cecilian, Jr., Doylestown, PA (US); Philip Worland, Hopewell, NJ (US); Joseph Conley, Glen Mills, PA (US)

(73) Assignee: Cecilian Partners, Inc., New Hope, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/780,757

(22) Filed: Jul. 23, 2024

(65) Prior Publication Data

US 2024/0378523 A1 Nov. 14, 2024

Related U.S. Application Data

(63) Continuation of application No. 17/990,222, filed on Nov. 18, 2022, now Pat. No. 12,067,510, which is a (Continued)

(51) Int. Cl.
*G06Q 10/06* (2023.01)
*G06Q 10/0631* (2023.01)

(52) U.S. Cl.
CPC .............................. *G06Q 10/06313* (2013.01)

(58) Field of Classification Search
CPC ...................................................... G06Q 10/06
See application file for complete search history.

(56) References Cited

U.S. PATENT DOCUMENTS 6,688,052 B1 * 2/2004 Flanders ................. E04H 1/005 52/234
8,279,219 B2 * 10/2012 Ghazali ................... E04H 1/005 52/169.2

(Continued)

FOREIGN PATENT DOCUMENTS

AU 2011100769 A4 8/2011
WO WO-2005069174 A1 * 7/2005 ............. E04H 1/005

(Continued)

OTHER PUBLICATIONS

Humstone, Elizabeth, Sprawl vs. Smart Growth, Vermont Forum on Sprawl, Summer 2004. (Year: 2004).*

(Continued)

*Primary Examiner* — Kurtis Gills
(74) *Attorney, Agent, or Firm* — Hoffmann & Baron, LLP

(57) ABSTRACT

System and method of providing anti-monotony construction in an MPC, including generating a database including streets, lots disposed on first and second sides of the streets, and neighbor lots disposed on left, right, and/or across sides of each of the lots; receiving a request for construction, including a lot and specification with details of a home, the lot selectable from available lots in the MPC, the specification including details selectable from available details; processing the request against a rule associated with diversity of the details of the specification from details of lots identified as consecutive neighbors on one or more sides of the lot, the sides and details of the lots considered identified in the rule; and generating a status of approval or denial based on whether at least one of the details of the specification matches at least one of the details of the lots identified as consecutive neighbors.

16 Claims, 7 Drawing Sheets

Related U.S. Application Data continuation of application No. 17/831,734, filed on Jun. 3, 2022, now Pat. No. 11,537,964.

(56) References Cited

U.S. PATENT DOCUMENTS

| | | | | |
|---|---|---|---|---|
| 10,452,791 | B2 | 10/2019 | Bauer et al. | |
| 10,515,372 | B1 | 12/2019 | Jordan, II et al. | |
| 10,565,665 | B2 | 2/2020 | Zabala Rodriguez | |
| 11,107,172 | B2 | 8/2021 | Budlong | |
| 11,244,412 | B1 | 2/2022 | Phillips et al. | |
| 11,537,964 | B1 | 12/2022 | Cecilian, Jr. et al. | |
| 2002/0066256 | A1* | 6/2002 | Oberpriller | G06F 30/13 52/745.13 |
| 2007/0263648 | A1* | 11/2007 | Driver | G06F 16/9535 370/411 |
| 2010/0042423 | A1* | 2/2010 | Murray | G06Q 50/165 705/1.1 |
| 2012/0110087 | A1* | 5/2012 | Culver | G06Q 10/101 709/205 |
| 2013/0182108 | A1* | 7/2013 | Meadow | G06T 17/05 348/143 |
| 2013/0238515 | A1 | 9/2013 | Ghazali | |
| 2014/0278280 | A1* | 9/2014 | Pardo-Fernandez | G06F 30/13 703/1 |
| 2015/0178866 | A1 | 6/2015 | Serio | |
| 2018/0025452 | A1 | 1/2018 | Fadeev et al. | |
| 2020/0098141 | A1* | 3/2020 | Mikkola | G06V 10/44 |
| 2020/0250775 | A1 | 8/2020 | Zabala Rodriguez | |
| 2020/0258174 | A1 | 8/2020 | Rodriguez | |
| 2021/0118073 | A1 | 4/2021 | Brisimi et al. | |
| 2021/0398152 | A1 | 12/2021 | Castinado et al. | |
| 2022/0130004 | A1 | 4/2022 | Phillips et al. | |

FOREIGN PATENT DOCUMENTS

| | | | |
|---|---|---|---|
| WO | WO 2020/026024 | A1 | 2/2020 |
| WO | WO 2021/148882 | A1 | 7/2021 |

OTHER PUBLICATIONS

International Search Report and Written Opinion issued in International Application No. PCT/US2023/015893 on Jun. 27, 2023.

Extended European Search Report issued in European Application No. 23816507.0 on Apr. 28, 2026.

* cited by examiner

710c — Rule 3 - Limit No. = 6; Side = Across; Arch Detail <plan> = DelMar | <Elevation> = A | <style> = colonial

FIG. 7C

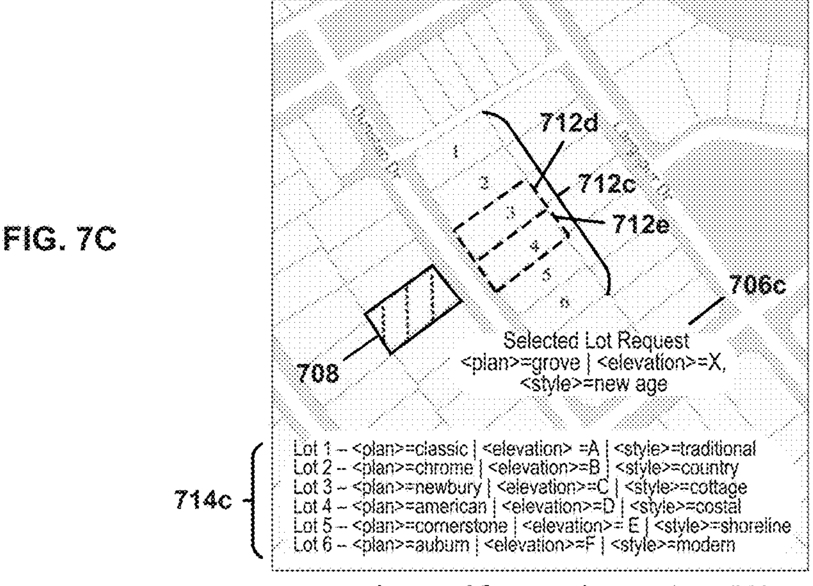

Approval Status = Approved — 716c
None of Architectural Details for selected lot violates Rule 3 for considered lots 1-6

710d — Rule 4 - Limit No. = 6; Side = left & right; Arch Detail <garage> = front; Coincidence = 2

FIG. 7D

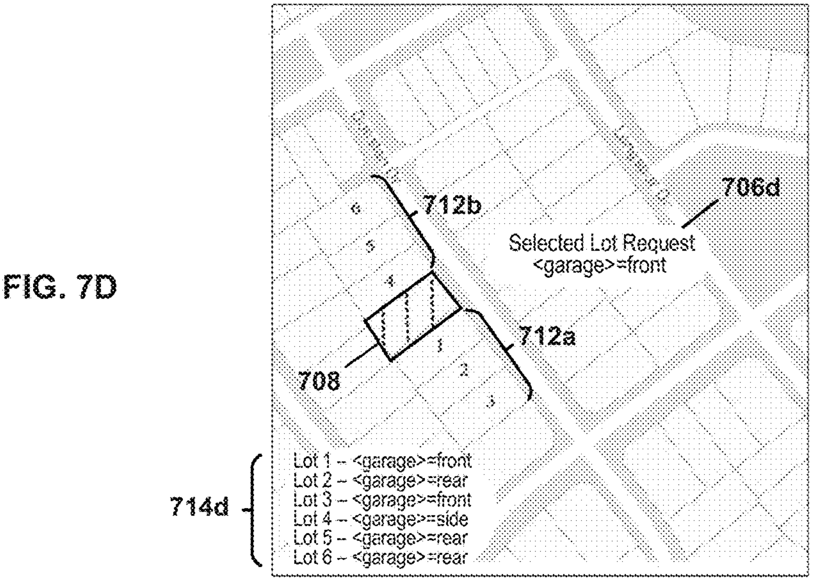

Approval Status = Approved — 716d
Architectural Detail of garage for selected lot does not violate Rule 4 for coincidence of considered lots 1-6 (<garage>=front does not exceed coincidence of 2 consecutive lots)

ANTI-MONOTONY SYSTEM AND METHOD ASSOCIATED WITH NEW HOME CONSTRUCTION IN A MASTER-PLANNED COMMUNITY

CROSS-REFERENCE TO RELATED APPLICATIONS

This application is a continuation of U.S. patent application Ser. No. 17/990,222, filed on Nov. 18, 2022, which is a continuation of U.S. patent application Ser. No. 17/831,734, filed on Jun. 3, 2022, now U.S. Pat. No. 11,537,964, the contents of which are incorporated herein by reference in their entirety.

BACKGROUND

Field

The present application relates to architectural diversity in master-planned communities. More specifically, the present application is directed to an anti-monotony system and method that is associated with new home construction in a master-planned community.

Brief Discussion of Related Art

Master-planned communities are quickly becoming ubiquitous throughout the world. A master-planned community or simply MPC is generally a large-scale residential neighborhood or even multiple residential neighborhoods planned on a sizable plot of land, and developed by a developer to include not only a plurality of lots for construction of new residential homes but can also include many amenities such as golf courses, tennis courts, lakes, parks, playgrounds, swimming pools, stores, restaurants, library, post office, etc., making such a community very attractive to new home buyers.

The developer plans the MPC to include elements such as streets, amenities, and lots, etc., and generally seeks various trades/builders to actually construct the MPC, including the streets, the amenities, and of course, the new homes on the lots. Depending on the size of the MPC and other considerations, such as time and costs, etc., the developer can engage a single or multiple builders to build the new homes in the MPC.

Moreover, the developer's aim in the construction of the MPC is to increase buyer interest and prices of the new homes. In connection with new home construction on the planned lots, the builder(s) would like to build as many same floorplan, style, and front elevation homes as possible, as this tends to reduce their construction time and costs, thus increasing the builder's potential profits. However, the developer generally considers architectural diversity of the homes in order to prevent repetition of homes such that they do not appear to be cookie-cutter, exactly like others that are closely located in the neighborhood, thus beautifying the neighborhood and helping improve buyer interest and increase home prices, thus increasing developer's potential profits.

Largely, the approval of builder's construction requests by the developer, which might consider architectural diversity, is an ad-hoc, mechanical pen-and-paper process, requiring significant investment of time, effort, and skill by the developer for large-scale residential neighborhoods that have many hundreds, and oftentimes thousands of lots on which new homes are to be constructed.

It is therefore desirable to provide a system and method that, based on provision of geospatial information associated with the streets and the lots of the MPC, implements an anti-monotony algorithm in connection with a request-and-approval process associated with the builder's construction of new homes on planned lots in the MPC.

SUMMARY

There are provided an anti-monotony system and method that is associated with new home construction in a master-planned community.

In accordance with an embodiment or aspect, there is disclosed a method providing anti-monotony construction in a master-planned community. The method includes generating a database based on geospatial information of the master-planned community, the database comprising identification of at least a plurality of streets, a plurality of lots disposed on first and second sides of the streets, and neighbor lots disposed on one or more of left, right, and across sides of each of the lots, wherein identification of at least one neighbor lot disposed on an across side of a lot disposed on a first side or a second side of a street comprises: identifying a frontage of the lot on the street; performing geo-projection of the frontage across the street within a first predetermined distance; and identifying the at least one neighbor lot having a frontage that is spanned at least partially by the frontage of the lot; receiving a request associated with construction of a new home in the master-planned community, the request including a selected lot and a selected specification including one or more architectural details associated with the new home, the selected lot being selectable from available lots of the plurality of lots for construction in the master-planned community, the selected specification including one or more architectural details being selectable from a plurality of available architectural details; processing the request against an anti-monotony rule associated with architectural diversity of the one or more architectural details of the selected specification from architectural details of multiple lots identified as being consecutive neighbors on one or more of the sides of the selected lot, the one or more of the sides and the architectural details of the multiple lots considered being identified in the anti-monotony rule; and generating a status of approval or denial of the request based on whether at least one of the architectural details of the selected specification matches at least one of the architectural details of the multiple lots identified as being consecutive neighbors.

In some cases, the method can further include recording, e.g., in a database associated with master-planned community, the selected specification of the one or more architectural details and the status of approval in association with the selected lot when the architectural details of the selected specification do not match the architectural details of the multiple lots identified as being consecutive neighbors.

The method can further include transmitting the status of approval in response to the request, or transmitting the status of denial when at least one of the architectural details of the selected specification matches at least one of the architectural details of the multiple lots identified as being consecutive neighbors.

In some cases, processing the request against the anti-monotony rule can include identifying the consecutive neighbors on the one or more of the sides of the selected lot based on a side indicator and a limit number specified in the anti-monotony rule, wherein the side indicator is capable of identifying left, right, left and right, or across sides of the selected lot, and the limit number is capable of identifying a total number of the consecutive neighbors in accordance with the side indicator; retrieving the architectural details of the multiple lots identified as consecutive neighbors, e.g., from the database associated with the master-planned community; and matching the one or more architectural details of the selected specification against the architectural details retrieved for the multiple lots identified as being consecutive neighbors.

In some cases, processing the request against the anti-monotony rule can include identifying the consecutive neighbors on the one or more of the sides of the selected lot based on a side indicator and a limit number specified in the anti-monotony rule, wherein the side indicator is capable of identifying left, right, left and right, or across sides of the selected lot, and the limit number is capable of identifying a total number of the consecutive neighbors in accordance with the side indicator; retrieving the architectural details of the multiple lots identified as consecutive neighbors, e.g., from the database associated with the master-planned community; and matching the one or more architectural details of the selected specification against the architectural details retrieved for the multiple lots identified as being consecutive neighbors based on a coincidence number of consecutive matches among the multiple lots required by the anti-monotony, the coincidence number being identified in the anti-monotony rule.

In accordance with the method, the database can include at least a lot identifier identifying each lot, a street identifier identifying a street associated with the lot identifier, a side identifier identifying a side of the street on which the lot is disposed, and left, right, and across neighbor lot identifiers associated with the lot identifier of each lot.

In some cases, generating the database can include processing geospatial information of contiguous line strings that represent street segments in order to identify the plurality of streets of the master-planned community; processing geospatial information of continuous closed polygons in order to identify the plurality of lots of the master-planned community; performing geo-projection of the line strings of each of the streets to identify a first ordered set of lots disposed on a first side of each of the streets, and a second ordered set of lots disposed on a second side of each of the streets; and processing each lot in the first ordered set of lots and in the second ordered set of lots for each of the streets to identify neighbors on left, right, and across sides of each lot in the master-planned community.

In some cases, processing each lot in the first ordered set of lots and in the second ordered set of lots for each of the streets can include identifying a left neighbor lot and a right neighbor lot that are within a second predetermined distance from each lot.

In some cases, processing each lot in the first ordered set of lots and in the second ordered set of lots for each of the streets can include identifying a frontage of each lot on an associated street; performing geo-projection of the frontage of each lot across the associated street within the first predetermined distance from the frontage of each lot; and identifying one or more across neighbor lots each having a frontage that is spanned at least partially by the fromage of each lot.

In accordance with another embodiment or aspect, there is disclosed a system to provide anti-monotony construction in a master-planned community. The system includes a computing device, and a memory device storing instructions that, when executed by the computing device, cause the computing device to perform the following operations.

The operations of the system include generating a database for the master-planned community, the database comprising identification of at least a plurality of streets, a plurality of lots disposed on first and second sides of the streets, neighbor lots disposed on one or more of left, right, and across sides of each of the lots, and architectural details of each of the lots, wherein identification of at least one neighbor lot disposed on an across side of a lot disposed on a first side or a second side of a street comprises: identifying a frontage of the lot on the street; performing geo-projection of the frontage across the street within a first predetermined distance; and identifying the at least one neighbor lot having a frontage that is spanned at least partially by the frontage of the lot; receiving a request associated with construction of a new home in the master-planned community, the request including a selected lot and a selected specification including one or more architectural details associated with the new home, the selected lot being selectable from available lots of the plurality of lots for construction in the master-planned community, the selected specification including one or more architectural details being selectable from a plurality of available architectural details; processing the request against an anti-monotony rule associated with architectural diversity of the one or more architectural details of the selected specification from architectural details of multiple lots identified as being consecutive neighbors on one or more of the sides of the selected lot, the one or more of the sides and the architectural details of the multiple lots considered being identified in the anti-monotony rule; and generating a status of approval or denial of the request based on whether at least one of the architectural details of the selected specification matches at least one of the architectural details of the multiple lots identified as being consecutive neighbors.

In some cases, the operations of the system can further include recording, e.g., in a database associated with the master-planned community, the selected specification of the one or more architectural details and the status of approval in association with the selected lot when the architectural details of the selected specification do not match the architectural details of the multiple lots identified as being consecutive neighbors.

In some cases, the operations of the system can further include transmitting the status of approval in response to the request, or transmitting the status of denial when at least one of the architectural details of the selected specification matches at least one of the architectural details of the multiple lots identified as being consecutive neighbors.

In some cases, the operations associated with processing the request against the anti-monotony rule can further include identifying the consecutive neighbors on the one or more of the sides of the selected lot based on a side indicator and a limit number specified in the anti-monotony rule, wherein the side indicator is capable of identifying left, right, left and right, or across sides of the selected lot, and the limit number is capable of identifying a total number of the consecutive neighbors in accordance with the side indicator; retrieving the architectural details of the multiple lots identified as consecutive neighbors, e.g., from the database associated with the master-planned community; and matching the one or more architectural details of the selected specification against the architectural details retrieved for the multiple lots identified as being consecutive neighbors.

In some cases, the operations associated with processing the request against the anti-monotony rule can further include identifying the consecutive neighbors on the one or more of the sides of the selected lot based on a side indicator and a limit number specified in the anti-monotony rule, wherein the side indicator is capable of identifying left, right, left and right, or across sides of the selected lot, and the limit number is capable of identifying a total number of the consecutive neighbors in accordance with the side indicator; retrieving the architectural details of the multiple lots identified as consecutive neighbors, e.g., from the database associated with the master-planned community; and matching the one or more architectural details of the selected specification against the architectural details retrieved for the multiple lots identified as being consecutive neighbors based on a coincidence number of consecutive matches among the multiple lots required by the anti-monotony, the coincidence number being identified in the anti-monotony rule.

In accordance with the system, the database can include at least a lot identifier identifying each lot, a street identifier identifying a street associated with the lot identifier, a side identifier identifying a side of the street on which the lot is disposed, and left, right, and across neighbor lot identifiers associated with the lot identifier of each lot.

In some cases, the operations associated with generating the database can further include processing geospatial information of contiguous line strings that represent street segments in order to identify the plurality of streets of the master-planned community; processing geospatial information of continuous closed polygons to identify lots of the master-planned community; performing geo-projection of the line strings of each of the streets to identify a first ordered set of lots disposed on a first side of each of the streets, and a second ordered set of lots disposed on a second side of each of the streets; and processing each lot in the first ordered set of lots and in the second ordered set of lots for each of the streets to determine neighbors on left, right, and across sides of each lot in the master-planned community.

In some cases, the operations associated with processing each lot in the first ordered set of lots and in the second ordered set of lots for each of the streets can include identifying a left neighbor lot and a right neighbor lot that are within a second predetermined distance from each lot.

In some cases, the operations associated with processing each lot in the first ordered set of lots and in the second ordered set of lots for each of the streets can include identifying a frontage of each lot on an associated street; performing geo-projection of the frontage of each lot across the associated street within the first predetermined distance from the frontage of each lot; and identifying one or more across neighbor lots each having a frontage that is spanned at least partially by the frontage of each lot.

These and other purposes, goals and advantages of the present application will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings in which:

FIGS. 7A-7D illustrate several examples of processing associated requests from a builder to a developer for construction of a new home having certain architectural detail(s), against architectural details of neighboring lots using an anti-monotony algorithm according to FIGS. 1-6.

DETAILED DESCRIPTION

A system and method associated with implementation of an anti-monotony algorithm in connection with a request-and-approval process associated with a builder's construction of new homes on planned lots in the MPC are disclosed herein. In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

Figure 1:
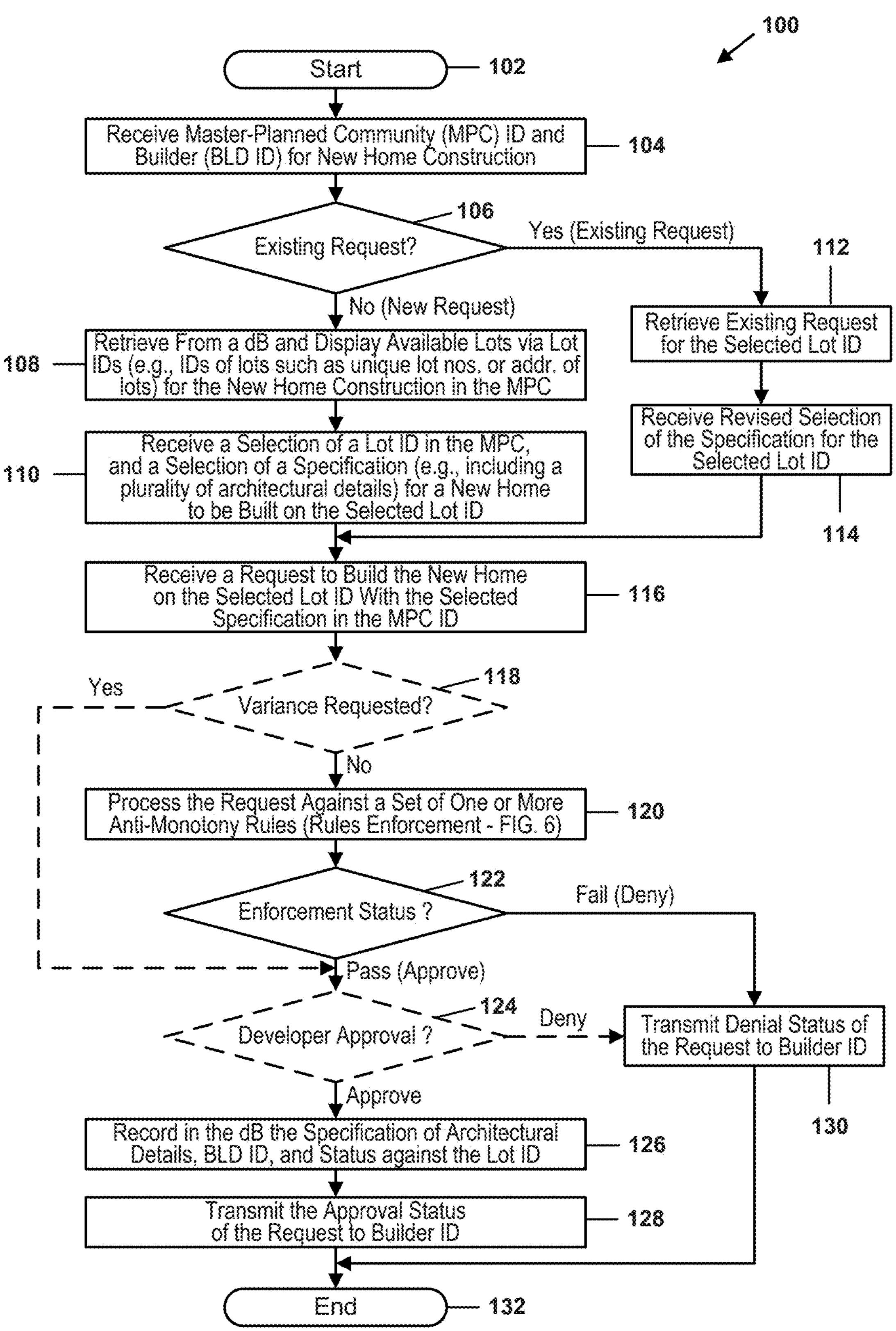
FIG. 1 illustrates a flowchart of an example method of processing a request from a builder(s) to a developer for construction of a new home with certain architectural details on a selected lot of the MPC, against architectural details of neighboring lots using an anti-monotony algorithm.

FIG. 1 illustrates a flowchart of an example method 100 of processing a request from a builder(s) to a developer for construction of a new home with certain architectural details on a selected lot of an MPC, against architectural details of neighboring lots using an anti-monotony algorithm.

The example method 100 starts at operation 102, wherein a builder executes on a client computing device (e.g., one of the computing devices 314-318 illustrated in FIG. 3) an MPC application provided by a server/content provider (e.g., server/content provider 304 illustrated in FIG. 3) on behalf of a developer, in connection with a request-and-approval process associated with the builder's construction of the new home on the selected lot of the MPC. Execution of the MPC application can include a set-up and login of the builder, such as by using a username and password associated with the builder.

At operation 104, the server/content provider receives in connection with the builder, a master-planned community identifier (MPC ID) the builder identifier (BLD ID) for a new home construction in the MPC. The MPC ID and BLD ID can be available from earlier set-up, and can thus be selected from a list by the builder, or can be selected by the builder via entry of the builder's identifier (BLD ID).

At operation 106, a determination is made as to whether this request is a new request or an existing request. If it is determined at operation 106 that this is a new request, the method 100 proceeds at operation 108, wherein the server/content provider retrieves from an MPC database (dB) (e.g., MPC dB 308 illustrated in FIG. 3) and displays lots of the MPC that are available for the construction of new homes, via lot identifiers (Lot IDs) that are associated with the lots (e.g., identifiers of lots can be unique lot nos. or addresses of lots) available for the new home construction in the MPC.

At operation 110, the server/content provider receives a selection of a Lot ID in the MPC, and a selection of a specification (e.g., including a plurality of architectural details 1 . . . n) for a new home to be built on the selected Lot ID. The architectural details of a new home can include details such as floorplan, architectural style of home ("style") (e.g., bungalow, traditional, colonial, cottage, ranch, tudor, farmhouse, etc.), front elevation of the home ("elevation") (e.g., certain configurations that might include position, size, and/or orientation of windows, garage, porch, and other details of the home), color group (e.g., color combination of details such as doors, windows, roofing, etc.), as well as one or more other architectural details. It should be noted that the enumerated list of architectural detail is not exhaustive, and can include a plurality of architectural details that might be important to the developer. The aforementioned details can be displayed by server/content provider to the developer as options, a combination of which the builder can select as the specification for the construction of the new home on the selected Lot ID.

If it is determined at operation 106 that this is an existing request, the method 100 proceeds at operation 112 wherein the server/content provider retrieves the existing request for the selected Lot ID. At operation 114, the server/content provider receives any revised selections of the specification for the selected Lot ID.

Thereafter, at operation 116, the server/content provider receives from the builder a request to build a new home on the selected Lot ID with the selected specification (e.g., specification of a selected plurality of architectural details) in the master-planned community (MPC ID).

An optional operation 118 can be provided concerning a variance in connection with a selected specification. In particular, at operation 118 a determination can be made as to whether the builder requested a variance. If it is determined that the builder did not request a variance at operation 118, the method 100 proceeds to operation 120 wherein the request is processed against a set of one or more anti-monotony rules for the master-planned community (e.g., rules of an MPC rules table 310 illustrated in FIG. 3), as enforcement of architectural diversity of the homes in order to prevent certain undesired repetition of the specification of the new home to neighboring homes in the MPC. However, if it is determined that the builder did request a variance at operation 118, the method 100 proceeds at operation 124 as described below, wherein the developer can then approve or deny the builder's request for the variance.

Thereafter, at operation 122 a determination is made as to whether enforcement status in connection with anti-monotony rules returns a "pass" or "fail" for construction of the home on the selected lot with the specification of selected architectural details. If it is determined at operation 122 that enforcement status is a "pass", then the method 100 continues at operation 124 wherein a determination is made as to whether the developer approves or denies the request. It should be noted that the developer can approve or deny the builder's request based on various other grounds, unrelated to the anti-monotony rules enforcement. It should further be noted that the operation 124 is optional, and that the approval or denial of the request can be automatically determined (e.g., automated approval/denial) based on the enforcement status determined at operation 122, irrespective of the developer approval.

If it is determined at operation 122 that enforcement status is a "fail", the method 100 continues at operation 130 wherein the server/content provider transmits a "denial" status of the request to the builder (BLD ID). Moreover, if it is determined at operation 124 that the developer denied construction of the home on the selected lot with specification of selected architectural details (e.g., manual approval/denial of developer), then the method also continues at operation 130, wherein the server/content provider transmits a "deny" status of the request to the builder (BLD ID). The denial can be automatically presented during the session of the application and/or can be emailed to the builder via an email server (not shown).

Thereafter, at operation 126 the server/content provider records in the MPC dB (e.g., MPC dB 308) the specification of the selected architectural details, builder's ID (BLD ID), and the approval status (e.g., approve or deny) against the Lot ID. At operation 128, server/content provider transmits the "approve" status of the request to the builder (BLD ID). The approval can be automatically presented during the session of the application and/or can be emailed to the builder via an email server (not shown). In one or more embodiments, the evaluation of the anti-monotony rules as well as automated and/or manual approval or denial of the enforcement of such rules can occur in real time, so that the builder can be provided immediate feedback as to approval or denial of the request, and upon denial can make changes to the request complying with the anti-monotony rules for the selected lot.

Figure 2:
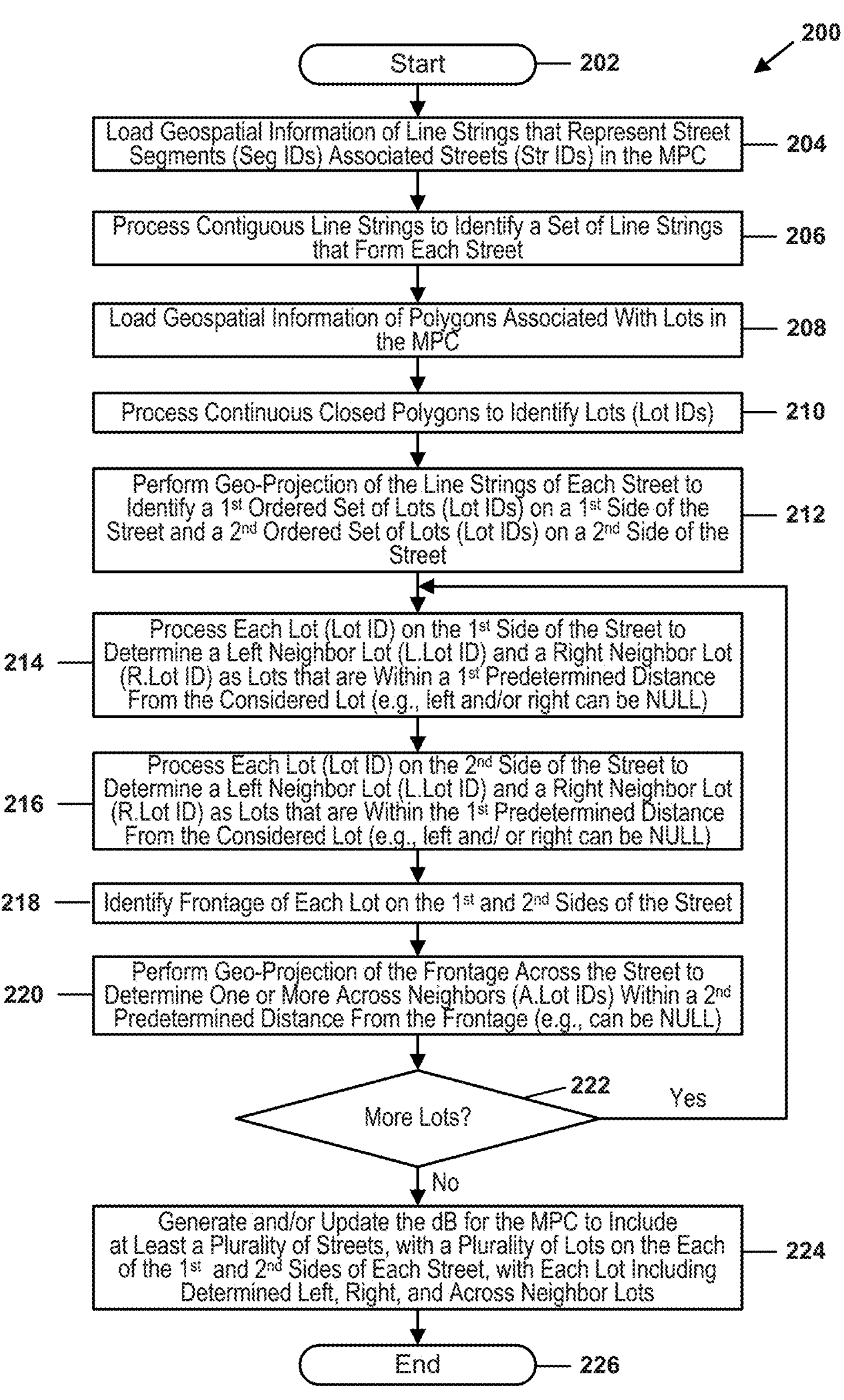
FIG. 2 illustrates a flowchart of an example method of generating an MPC database associated with implementation of the anti-monotony algorithm in connection with the construction of new homes on lots of the MPC.

FIG. 2 illustrates a flowchart of an example method 200 of generating an MPC database 308 associated with implementation of the anti-monotony algorithm in connection with the construction of new homes on lots of the MPC (e.g., master-planned community 700).

The example method 200 starts at operation 202, wherein a builder executes on a client computing device (e.g., computing device 302 illustrated in FIG. 3) an MPC application provided by a server/content provider (e.g., server/content provider 304 illustrated in FIG. 3), in connection with setting up a master-planned community (MPC 700) that will be used in the construction of the new home with the implementation of the anti-monotony algorithm as described herein. Execution of the MPC application can include a set-up and login of the developer, such as by using a username and password associated with the developer. Multiple developers can each develop one or more MPCs. It should be noted that the developer can upload to or can provide access to the server/content provider, the various geospatial information or electronic files identifying, describing, or representing the MPC in connection with the example method 200.

At operation 204, server/content provider loads geospatial information of line strings that represent street segments (Seg IDs) associated with streets (Str IDs) in the MPC. At operation 206, server/content provider processes the geospatial information of contiguous line strings in order to identify a set of line strings that forms each street. At operation 208, server/content provider loads geospatial information of polygons that are associated with lots in the MPC. At operation 210, server/content provider processes the geospatial information of continuous, closed polygons in order to identify lots (Lot IDs) in the MPC. At operation 212, the server/content provider performs a geo-projection of the line strings of each street in order to identify a first ordered set of lots (Lot IDs) on a first side of the street and a second ordered set of lots (Lot IDs) on a second side of each street.

Thereafter, at operation 214, the server/content provider processes each lot (Lot ID) on the first side of the street to determine a left neighbor lot (L.Lot ID) and a right neighbor lot (R.Lot ID) as lots that are within a first predetermined distance from the considered lot (e.g., left and/or right lots on the first side can be NULL). The first predetermined distance can be 50 feet, or another smaller or larger distance. Similarly, at operation 216, the server/content provider processes each lot (Lot ID) on the second side of the street to determine a left neighbor lot (L.Lot ID) and a right neighbor lot (R.Lot ID) as lots that are within the first predetermined distance from the considered lot (e.g., left and/or right on the second side can also be NULL). While the same first predetermined distance can be used for the first and second sides of the street, it is possible to use different predetermined distances based on certain aspects of the MPC, such as dimensions of the actual lots, wherein the wider the lots the larger the predetermined distance that can be used (e.g., lots that are larger on a second side of the street than lots on the first side of the street).

In view of the aforementioned, if the distance to a certain lot from the lot under consideration is less than or equal to the first predetermined distance, then that lot is considered a left or right neighbor lot, and can thus be recorded thereafter as a respective neighbor lot. Alternatively, if the distance to the certain lot from the lot under consideration is greater than the first predetermined distance, then that lot is not considered a neighbor lot, and a designation of NULL can be used for either left and/or right neighbor lot in connection with the lot under consideration. The first predetermined distance can account for certain intervening spaces such as easements, etc, wherein the lots can still be counted as neighbor lots, and can also account for other intervening spaces, such as parks, etc, wherein the lots might not be counted as neighbor lots.

At operation 218, the server/content provider identifies a frontage of each lot (Lot ID) on the first side and the second side of each of the streets. A frontage is a line of the lot under consideration that is closest to street and extends along the street that it faces. At operation 220, the server/content provider performs a geo-projection of the frontage across the street to determine one or more across neighbors (A.Lot IDs) within a second predetermined distance from the frontage (e.g., the across neighbor can be NULL in cases where across the street there might not be a lot).

As an example, the second predetermined distance can be given by twice a distance from the frontage of the lot to a midline of the street, plus a buffer distance. For example, when frontage is 25 feet to the midline of street and a buffer distance is 15 feet, the second predefined distance can then be 65 feet (e.g., computed as (2*25)+15). Moreover, the frontage can also span multiple lots across the street (e.g., frontage of lot 708 spans the frontages of across lots 712*d*, 712*e* as illustrated in FIG. 7C). In some cases, all spanned lots can be considered as neighbors. In other cases, an across neighbor can be determined when a portion of the frontage of the lot under consideration extends along the frontage of the lot across the street, and that portion is greater than a predetermined percentage of the frontage of that lot across the street. For example, the predetermined percentage can be 10%, or alternatively higher or lower percentage can be used. Lastly, in some other cases, a single across neighbor out of the possible across neighbors can be considered as the one in which the frontage of the lot under consideration spans a largest percentage of that lot's frontage as compared to the other possible across neighbors.

At operation 222, a determination is made as to whether there are more lots to process. If it is determined that there are more lots to process at operation 222, then the method 200 continues at operation 214, operations 214-222 are iterated until all lots have been processed as determined at operation 222.

However, if it is determined that there are no more lots to process at operation 222, then method 200 continues at operation 224, wherein the server/content provider generates and/or updates the dB for the MPC (e.g., dB 308 for MPC 700) to include at least a plurality of streets, with a plurality of lots on each of the first and second sides of each street, with each lot including determined left, right, and across neighbor lots. As described herein, certain left, right, and/or across neighbors can be determined to be NULL. It should be noted that the dB for the MPC can include other fields, the values of which might be initialized and/or recorded at another time (e.g., values for the architectural details, builder ID, and approval status of MPC dB 308 illustrated in FIG. 4 can be initialized and/or recorded at a different time).

Figure 3:
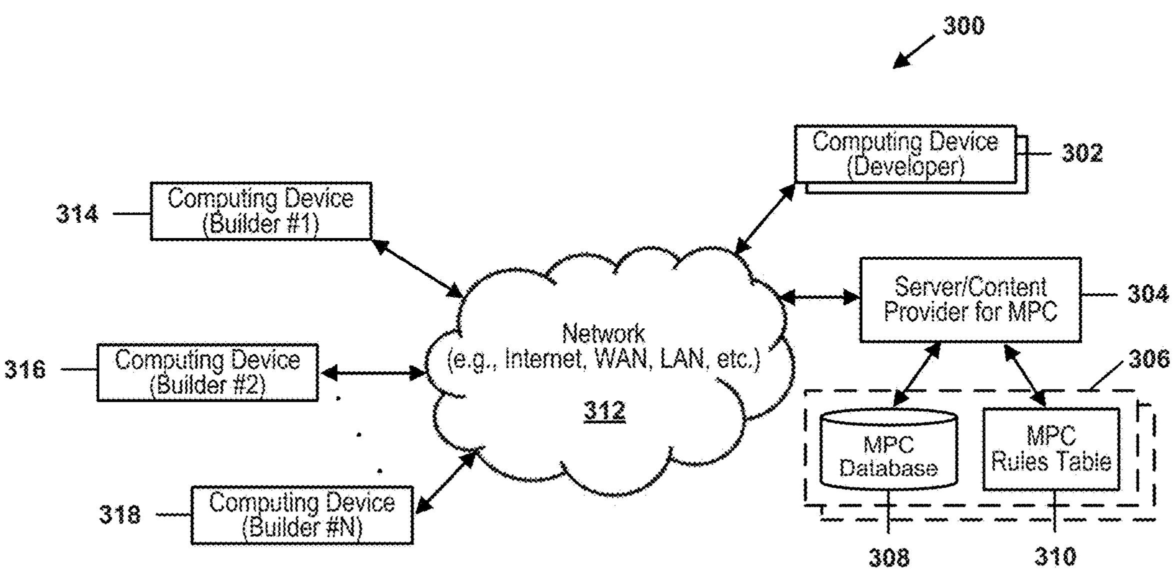
FIG. 3 illustrates a block diagram of an example system with an MPC database and an MPC rules table, associated with the processing of requests from the builder(s) to the developer for construction of new homes having certain architectural details, against architectural details of neighboring lots using an anti-monotony algorithm.
Figure 4:
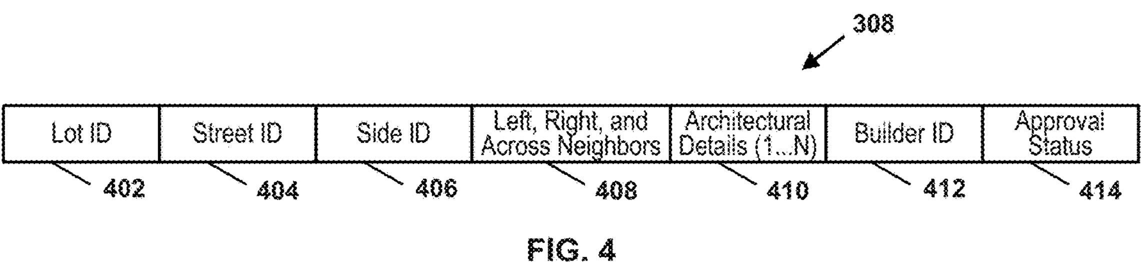
FIG. 4 illustrates example fields of the example MPC database associated with the construction of new homes, in accordance with FIGS. 1-3.

Thereafter, the method 200 ends at operation 226, wherein the MPC database for the master-planned community MPC is generated or updated (e.g., MPC dB 308 is generated and/or updated as particularly illustrated in FIGS. 3 and 4).

FIG. 3 illustrates a block diagram of an example system 300 with an MPC database 308 and an MPC rules table 310, associated with the processing of requests from one or more of the builder(s) 314-318 to the developer 302 for construction of new homes having certain architectural details, against architectural details 410 of neighboring lots using an anti-monotony algorithm.

The example system 300 includes a developer computing device 302, a plurality of builder computing devices 314-318 associated with a respective plurality of builders, a server/content provider 304, and information 306 associated with a developer's master-planned community (MPC). The information associated with each MPC includes an MPC database 308 and an MPC rules table 310, as described herein.

The computing devices 302, 314-318 can communicate with the server/content provider 304 via a network 312. The network 312 can be the Internet, wide area network (WAN), local area network (LAN), and/or one or more other types of known types of networks (e.g., various wired or wireless technologies including cellular, satellite, etc.) or other types of networks developed in the future.

It should be noted that the example system 300 can include multiple developers 302, and each developer can represent one or more master-planned communities (MPCs). Accordingly, each MPC of the one or more developers is associated with a different information 306, which included a different MPC database 308 and a different MPC rules table 310 for each master-planned community.

Using the computing device 302, a developer can set up the MPC database 308 and the MPC rules table 310 for a developer's master-planned community (MPC) though the server/content provider 304, as described with reference to FIGS. 2 and 5 (MPC rules table 310 is described in greater detail below with reference to FIG. 5). The server/content provider 304 processes certain geospatial information associated with streets and the lots of the master-planned community (MPC), determines the streets and the lots in the MPC and for each of the lots determines left, right, and/or across neighbors, and generates the MPC database 308 as described herein in FIGS. 2-4.

Figure 6:
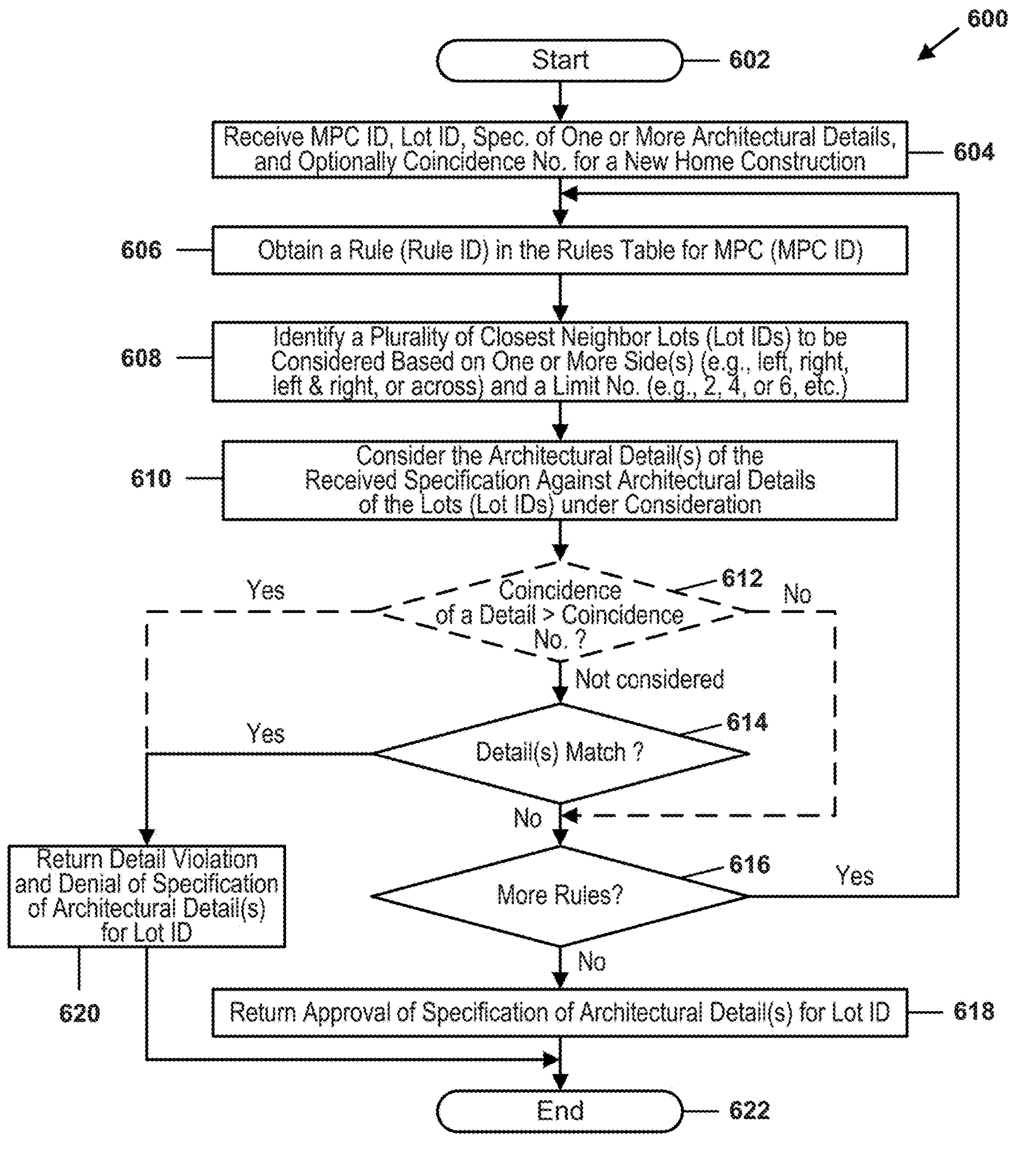
FIG. 6 illustrates a flowchart of an example method of processing a request to build on a selected lot a home with a specification of selected architectural details, against one or more anti-monotony rules of the MPC, in accordance with FIGS. 1-5.

Using a computing device 314, a builder can request the developer via server/content provider 304 to approve construction of a new home with certain selected architectural details on a selected lot of the MPC, wherein the request can be processed for automatic approval against the architectural details of neighboring lots using an anti-monotony algorithm, or can be further approved by the developer, as described in greater detail herein with reference to FIGS. 1 and 6 (FIG. 6 is described in greater detail below). The approval or denial of the developer can be communicated from the server/content provider 304 to the computing devices 314-318 via the network 312.

FIG. 4 illustrates example fields 404-414 of the example MPC database 308 associated with the construction of new homes in the master-planned community (MPC), in accordance with FIGS. 1-3. The MPC database 308 includes Lot ID 402, Street ID 404, Side ID 406, neighbors (left, right and/or across) 408, one or more architectural details (1 . . . . N) 410, builder (BLD ID) 412, and approval status 414.

While the fields are shown consecutively for clarity and brevity, it should be noted that the MPC database 308 can be a relational database, wherein the fields can be included in different tables that are related by primary, secondary, etc. keys, such as via a primary key of Lot ID.

The Lot ID 402, Street ID 404, Side ID 406, and neighbors (left, right, and/or across) 408 are determined in accordance with the generation of the MPC database 308 according to the example method 200 illustrated in FIG. 2. Moreover, the one or more architectural details (1 . . . . N) 410, builder (BLD ID) 412, and approval status 414 are recorded to the MPC database 308 in accordance with the approval of example methods 100, 600 illustrated respectively in FIGS. 1, 6.

Figure 5:
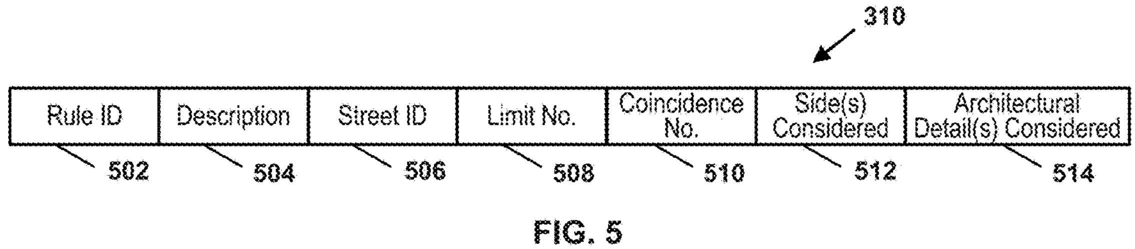
FIG. 5 illustrates an anti-monotony rules table of the MPC for the processing of a request from a builder(s) to a developer for construction of a new home, in accordance with FIGS. 1-3.

FIG. 5 illustrates an anti-monotony MPC rules table 310 associated with processing a request from one or more builder 314-318 to a developer 302 for the construction of a new home in the MPC on a selected lot with selected architectural details, in accordance with FIGS. 1-3.

The MPC rules table 310 includes a rule ID 502, description of the rule 504, street ID associated with the rule 506, limit number 508, coincidence number 510, sides considered 512, and one or more architectural details considered 514.

The rule ID 502 uniquely identifies a certain rule for the MPC. The description 504 briefly describes the nature of the rule. The street ID 506 can indicate that only a specific street or streets are to be considered by the rule 502. The street ID 506 can be NULL in which case all streets can be considered by the rule.

The limit number 508 indicates a value of consecutive neighboring lots that are to be considered. The coincidence number 510 indicates how many coincidences of an architectural detail can be consecutively present in the limit no. of neighboring lots. The sides considered 512 indicates which sides the rule is to consider, i.e., left or right, left and right, or across. The one or more architectural details 514 indicates the architectural details that are to be considered by the rule in connection with the request for construction on a selected lot against its neighboring lots.

Figure 7A:
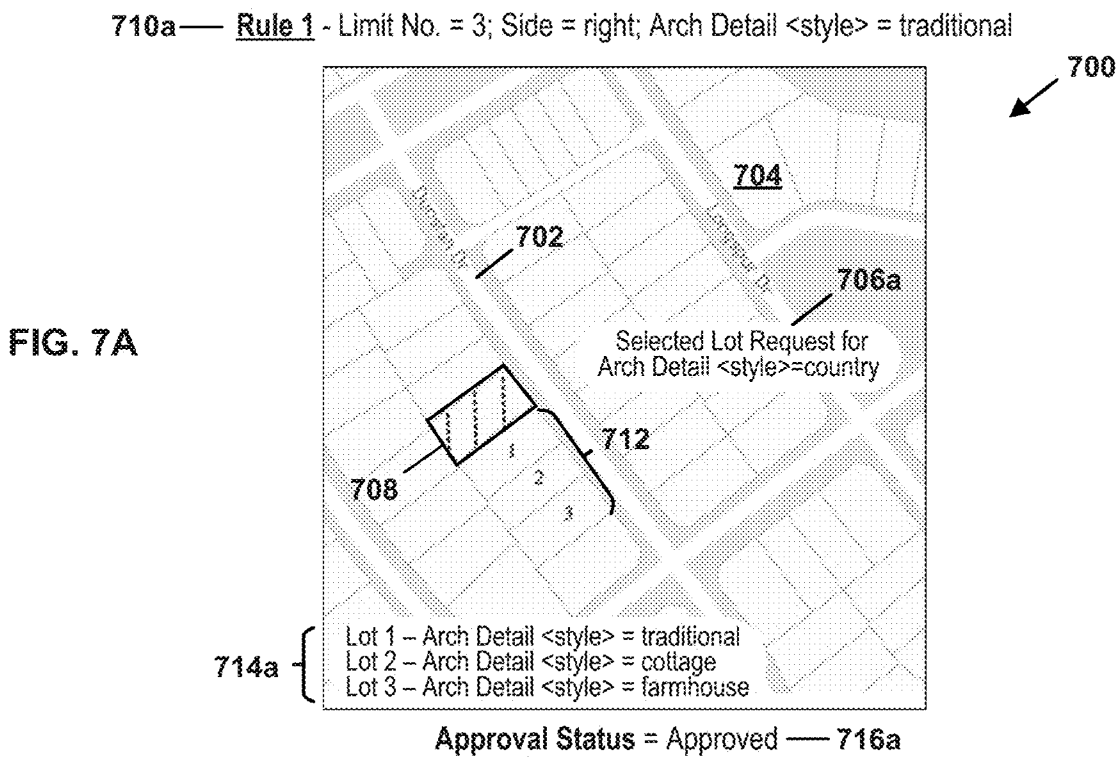

For example, if the limit no. 508 is three (3) and the side considered 512 is right, then three consecutive neighbors on the right of the selected lot are considered by the rule 502, as shown for example in FIG. 7A.

Figure 7B:
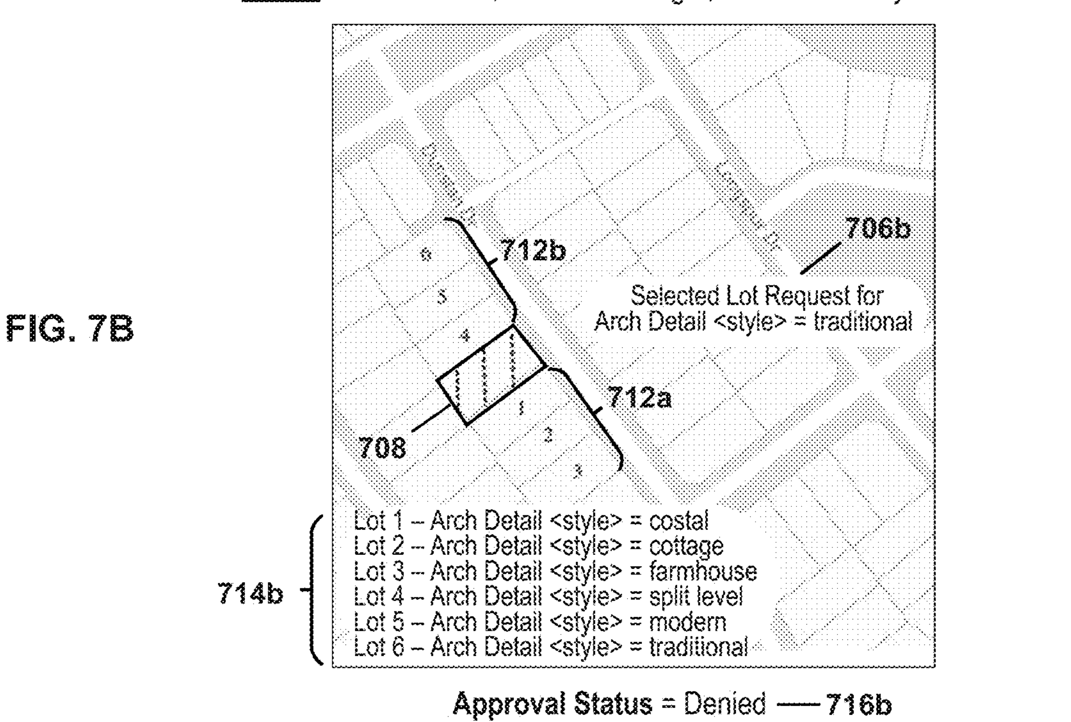

As another example, if the limit no. 508 is six (6) and the sides considered 512 are right and left, then three (3) consecutive neighbors on the right and three (3) consecutive neighbors on the left of the selected lot for a total of six (6) are considered by the rule 502, as shown for example in FIG. 7B. In this case, the limit number is divided by two (i.e., left and right sides) and three (3) consecutive neighbors on the right and three (3) consecutive neighbors on the left are thus considered. If the limit no. is odd (e.g., limit no. is five (5)), then either right or left can have a greater number of neighbors considered. Similarly, if there are not sufficient consecutive neighbors to the left or the right of the selected lot, then only the available number of neighbors to the left or to the right can be considered.

As a further example, if the limit no. 508 is six (6) and the side considered 512 is across, then six (6) consecutive neighbors are considered in total, starting from the determined across neighbor or neighbors of the selected lot, as shown for example in FIG. 7C. In this case, number of the determined across neighbors (e.g., two (2)) can be subtracted from the limit no., and the formed intermediate limit number can similarly be divided by two (i.e., left and right sides of the determined across neighbors for the selected lot 708), with two across neighbors 712*d*, 712*e* and two (2) consecutive neighbors on the right and two (2) consecutive neighbors on the left are thus considered. If the limit no. is odd (e.g., limit no. is five (5)), then either right or left of the across neighbors 712*d*, 712*e* can have a greater number of neighbors considered. Similarly, if there are not sufficient consecutive neighbors to the left or the right of the across neighbors 712*d*, 712*e*, then only the available number of neighbors to the left or to the right can be considered.

FIG. 6 illustrates a flowchart of an example method 600 of processing a request to build on a selected lot a home with a specification of selected architectural details, against one or more anti-monotony rules of the MPC, in accordance with FIGS. 1-5. The example method 600 executes the operation 120 as illustrated in FIG. 1, processing the request against a set of one or more anti-monotony rules (rules enforcement) for the master-planned community (MPC).

The example method 600 starts at operation 600, wherein it is called or executed by the operation 120 of FIG. 1. At operation 604, there is received an MPC ID associated with the master-planned community, a Lot ID associated with the selected lot for new home construction, a Specification of one or more architectural details for the new home that is to be constructed on the lot, and optionally a coincidence number for an architectural detail that might be present in consecutive neighbor lots under consideration.

At operation 606, a rule (e.g., via Rule ID) is obtained from the MPC rules table 310 for MPC (MPC ID). At operation 608, a plurality of closest neighbor lots (Lot IDs) that are to be considered by the rule are identified from the MPC dB 308 based on one or more side(s) considered (e.g., left, right, left and right, or across) and a limit number of neighbors considered (e.g., 2, 4, or 6, etc.). At operation 610, the method 600 considers architectural detail(s) of the received specification against the architectural details of the closest neighbor lots (Lot IDs) under consideration.

Thereafter, at operation 612 a determination is made as to whether coincidence for a detail determined among the consecutive neighbor lots is greater than the coincidence number for that detail as set forth in the rule. If it is determined at operation 612 that the coincidence number for the detail determined among the consecutive neighbor lots is less than or equal the coincidence number as set forth in the rule, the method 600 continues at operation 616 wherein a further rule can be considered. If it is determined at operation 612 that the coincidence number is not defined and therefore is not to be considered, the method 600 continues at operation 614 wherein a determination is made as to whether any of architectural details of the selected lot for new home construction matches any of the architectural details of the plurality of closest neighbors under consideration.

If it is determined at operation 612 that coincidence number for the detail determined among the consecutive neighbor lots is greater than the coincidence number as set forth in the rule, or it is determined at operation 614 that any of the architectural details of the selected matches any of the architectural details of the plurality of closest neighbors under consideration, the method 600 continues at operation 620 wherein the method 600 returns a violation of an architectural detail and a denial of the specification of architectural detail(s) for the selected lot (Lot ID).

At operation 616, a determination is made as to whether there are more rules in the MPC rules tables 310 to process for the master-planned community (MPC). If it is determined at operation 616 that there are more rules to process, the method 600 iterates operations 606-616 until it is determined at operation 616 that there are no more rules to process for the MPC.

Thereafter, at operation 618 the method 600 returns an approval of the specification of the one or more architectural detail(s) for selected lot (Lot ID) for new home construction. The method ends at operation 622 and control is returned to operation 122 of FIG. 1, having completed execution of method 600 in connection with the execution of operation 120 in FIG. 1.

FIGS. 7A-7D illustrate several examples of processing associated requests from a builder to a developer for construction of a new home having certain architectural detail(s), against architectural details of neighboring lots using an anti-monotony algorithm, in accordance with FIGS. 1-6.

FIG. 7A illustrates an example master-planned community (MPC) 700, which includes a plurality of streets 702, and a plurality of associated lots 704 associated with the streets 702, for the construction of new homes in the MPC 700 in accordance with FIGS. 1-6. The MPC database 308 as illustrated in FIG. 3 is generated in accordance with FIG. 2, and maintains information concerning the plurality of lots 704 of the MPC 700 according to the field definitions 402-414 of the MPC dB 308 as illustrated in FIG. 4.

In this first example, the builder selects an MPC 700, a lot 708, and a specification of one or more architectural details associated with the selected lot 708 for the construction of a new home, and a request 706*a* is thus generated for the selected lot 708 in the MPC 700, in accordance with the operations 104-116.

The request 706*a* is processed at operation 120 of FIG. 1 against one or more anti-monotony rules for the MPC 700 maintained in the MPC rules table 310, according to the field definitions 502-514 of the MPC rules table 310 as illustrated in FIG. 5. A rule 710*a* (Rule 1) is given as an example with certain of the important fields, including a limit no.=3, a side=right, and an architectural detail of style=traditional. The rule 710*a* is retrieved from the MPC rules table 310 by the operation 606 of FIG. 6.

An example plurality of closest neighbor lots (Lot IDs) 712 considered by the rule 710*a* are identified in relation to the selected lot 708 from the MPC dB 308 based on the side considered (e.g., side=right) and the limit number of neighbors considered (e.g., limit no.=3) of the rule 710*a*. Architectural details 714*a* of the identified lots 712 (e.g., style of lot 1=traditional, style of lot 2=cottage, and style of lot 3=farmhouse) that are under consideration are determined from the MPC database 308, and are considered against the requested specification of one or more architectural details (e.g., style=country) for the selected lot 708 shown in the request 706*a*, as illustrated by the operation 610 of FIG. 6.

The architectural detail (e.g., style=country) for the selected lot 708 does not violate the first rule 710*a* for respective architectural details of the considered lots 714*a* (e.g., respective styles of traditional, cottage, and farmhouse). Accordingly, an enforcement status of pass/approve in connection with the anti-monotony rule 710*a* can thus be returned by the operation 618 of FIG. 6 (e.g., as output of the operation 120) to the operation 122 of FIG. 1. In one or more embodiments, as described hereinabove in greater detail, the enforcement status, whether automated and/or manual, can be returned in real time in order to provide immediate feedback to the builder regarding the request 706*a*. It should be noted that rule 710*a* did not provide a coincidence no. in this example.

In the automatic approval embodiment, the specification of the architectural detail (e.g., style=country) for the selected lot 708, the builder ID, and the enforcement or approval status pass/approve are recorded in the MPC database 308 by operation 126 of FIG. 1, and the enforcement status/approval status is transmitted to the builder (BLD ID), such as via in-session display and/or via email. Alternatively, as illustrated in the optional operation 124 of FIG. 1, the developer can nonetheless deny, or can simply maintain the approval.

FIG. 7B illustrates the same example master-planned community (MPC) 700, which includes a plurality of streets 702, and a plurality of associated lots 704 associated with the streets 702, for the construction of new homes in the MPC 700 in accordance with FIGS. 1-6. Similarly, the MPC database 308 as illustrated in FIG. 3 is generated in accordance with FIG. 2, and maintains information concerning the plurality of the lots 704 of MPC according to the field definitions 402-414 of the MPC dB 308 as illustrated in FIG. 4.

In this second example, the builder selects an MPC 700, a lot 708, and a specification of one or more architectural details associated with the selected lot 708 for the construction of a new home, and a request 706*b* is thus generated for the selected lot 708 in the MPC 700, in accordance with the operations 104-116.

The request 706*b* is processed at operation 120 of FIG. 1 against one or more anti-monotony rules for the MPC 700 maintained in the MPC rules table 310, according to the field definitions 502-514 of the MPC rules table 310 as illustrated in FIG. 5. A rule 710*b* (Rule 2) is given as an example with certain of the important fields, including a limit no.=6, sides=left and right, and an architectural detail of style=traditional. The rule 710*b* is retrieved from the MPC rules table 310 by the operation 606 of FIG. 6.

An example plurality of closest neighbor lots (Lot IDs) 712*a*, 712*b* (three right and three left for a total of six) considered by the rule 710*a* are identified in relation to the selected lot 708 from the MPC dB 308 based on the side considered (e.g., sides=right and left) and the limit number of neighbors considered (e.g., limit no.=6; thus 3-left and 3-right) of the rule 710*b*. Architectural details 714*b* of the identified lots 712*a*, 712*b* (e.g., respective styles of the lots: coastal, cottage, farmhouse, split level, modern, and traditional) that are under consideration are determined from the MPC database 308, and are considered against the requested specification of one or more architectural details (e.g., style=traditional) for the selected lot 708 shown in the request 706*b*, as illustrated by the operation 610 of FIG. 6.

The architectural detail (e.g., style=traditional) for the selected lot 708 violates the second rule 710*b* for the architectural detail (e.g., style=traditional) of the considered lot no. six (6) of lots 712*b* identified on the left side of the selected lot 708.

Accordingly, a detail violation and denial of the specification can be returned in connection with the anti-monotony rule 710*b* by operation 620 of FIG. 6 to operation 122 of FIG. 1. It should be noted that the second rule 710*b* also did not provide a coincidence no. in this example.

In the automatic approval embodiment, the enforcement status of denial is transmitted to the builder (BLD ID) at operation 130 of FIG. 1, such as via in-session display and/or via email.

FIG. 7C illustrates the same example master-planned community (MPC) 700, which includes a plurality of streets 702, and a plurality of associated lots 704 associated with the streets 702, for the construction of new homes in the MPC 700 in accordance with FIGS. 1-6. Similarly, the MPC database 308 as illustrated in FIG. 3 is generated in accordance with FIG. 2, and maintains information concerning the plurality of the lots 704 of MPC according to the field definitions 402-414 of the MPC dB 308 as illustrated in FIG. 4.

In this third example, the builder selects an MPC 700, a lot 708, and a specification of one or more architectural details associated with the selected lot 708 for the construction of a new home, and a request 706*c* is thus generated for the selected lot 708 in the MPC 700, in accordance with the operations 104-116.

The request 706*c* is processed at operation 120 of FIG. 1 against one or more anti-monotony rules for the MPC 700 maintained in the MPC rules table 310, according to the field definitions 502-514 of the MPC rules table 310 as illustrated in FIG. 5. A rule 710*c* (Rule 3) is given as an example with certain of the important fields, including a limit no.=6, a side-across, and architectural details of floorplan=DelMar|elevation=A|style=colonial. The rule 710*c* is retrieved from the MPC rules table 310 by the operation 606 of FIG. 6.

An example plurality of closest across neighbor lots (Lot IDs) 712*c* considered by the rule 710*c* are identified in relation to the selected lot 708 from the MPC dB 308 based the side considered (e.g., side=across) and the limit number of neighbors considered (e.g., limit no.=6) of the rule 710*c*. In this regard, the across neighbors that were previously determined for the lot 708 are lots 712*d*, 712*e*, as the frontage of the lot 708 extends along frontages of the lots 712*d*, 712*e*. Accordingly, several additional lots are identified on the right and left sides of the respective lots 712*d*, 712*e*, for a total of six (6) consecutive lots 712*c* identified across from the selected lot 708.

Architectural details 714*c* of the identified across lots 712*c* that are under consideration are determined from the MPC database 308, and are considered against the requested specification of one or more architectural details for the selected lot 708 shown in the request 706*c*, as illustrated by the operation 610 of FIG. 6.

None of the architectural details for the selected lot 708 violates the third rule 710*c* for architectural details of the considered lots 714*c*. It should be noted that in some embodiments, a match of any one architectural detail of the rule among the selected lot 708 and any lot of one of the considered lots 712*c* can cause a denial, e.g., any one match of floorplan, elevation, or style can thus cause the denial. In other embodiments, a match of all architectural details of the rule among the selected lot 708 and any lot of one of the considered lots 712*c* can cause a denial, e.g., floorplan, elevation, and style must all match to cause the denial. In yet other embodiments, a match of a plurality of the architectural details of the rule among the selected lot 708 and any lot of one of the considered lots 712*c* can cause a denial, e.g., two of the three architectural details (e.g., floorplan and elevation, floorplan and style, or elevation and style) must match to cause the denial.

Accordingly, an enforcement status of pass/approve in connection with the anti-monotony rule 710*c* can thus be returned by the operation 618 of FIG. 6 to the operation 122 of FIG. 1. It should be noted that rule 710*c* did not provide a coincidence no. in this example. In the automatic approval embodiment, the specification of the architectural details for the selected lot 708, the builder ID, and the enforcement or approval status pass/approve are recorded in the MPC database 308 by operation 126 of FIG. 1, and the enforcement status/approval status is transmitted to the builder (BLD ID), such as via in-session display and/or via email. Alternatively, as illustrated in the optional operation 124 of FIG. 1, the developer can nonetheless deny, or can simply maintain the approval.

FIG. 7D illustrates the same example master-planned community (MPC) 700, which includes the plurality of streets 702, and the plurality of associated lots 704 associated with the streets 702, for the construction of new homes in the MPC 700 in accordance with FIGS. 1-6. Similarly, the MPC database 308 as illustrated in FIG. 3 is generated in accordance with FIG. 2, and maintains information concerning the plurality of the lots 704 of MPC according to the field definitions 402-414 of the MPC dB 308 as illustrated in FIG. 4.

In this fourth and last example, the builder selects an MPC 700, a lot 708, and a specification of one or more architectural details associated with the selected lot 708 for the construction of a new home, and a request 706*d* is thus generated for the selected lot 708 in the MPC 700, in accordance with the operations 104-116.

The request 706*d* is processed at operation 120 of FIG. 1 against one or more anti-monotony rules for the MPC 700 maintained in the MPC rules table 310, according to the field definitions 502-514 of the MPC rules table 310 as illustrated in FIG. 5. A rule 710*d* (Rule 4) is given as an example with certain of the important fields, including a limit no.=6, a side=left and right, architectural detail of style=traditional, and coincidence no.=2. The rule 710*d* is retrieved from the MPC rules table 310 by the operation 606 of FIG. 6.

An example plurality of closest neighbor lots (Lot IDs) 712*a*, 712*b* considered by the rule 710*d* are identified in relation to the selected lot 708 from the MPC dB 308 based the side considered (e.g., side=left and right) and the limit number of neighbors considered (e.g., limit no.=6) of the rule 710*d*. Architectural details 714*d* of the identified lots 712*a*, 712*b* (e.g., respective garage orientation of lots 1-front, 2-rear, 3-front, 4-side, 5-rear, and 6-rear) that are under consideration are determined from the MPC database 308, and are considered against the requested specification of one or more architectural details (e.g., garage orientation=front) for the selected lot 708 shown in the request 706*d*, as illustrated by the operation 610 of FIG. 6.

The architectural detail (e.g., garage orientation=front) for the selected lot 708 does not violate the fourth rule 710*d* related to consecutive coincidence (e.g., coincidence no.=2) of architectural details of the considered lots 714*d* (e.g., respective garage orientations are front, rear, front, side, rear, and rear). There are not two consecutive garages of lots under consideration having a garage orientation of front, i.e., lots 1 and 3 of the lots 712*a* on the right side of the selected lot 708 have garage orientations of front, but they are not consecutive and are separated by lot 2 that has a garage orientation of rear. Accordingly, an enforcement status of pass/approve in connection with the anti-monotony rule 710*d* can thus be returned by the operation 618 of FIG. 6 to the operation 122 of FIG. 1.

In the automatic approval embodiment, the specification of the architectural detail (e.g., garage=front) for the selected lot 708, the builder ID, and the enforcement or approval status pass/approve are recorded in the MPC database 308 by operation 126 of FIG. 1, and the enforcement status/approval status is transmitted to the builder (BLD ID), such as via in-session display and/or via email. Alternatively, as illustrated in the optional operation 124 of FIG. 1, the developer can nonetheless deny, or can simply maintain the approval.

Figure 8:
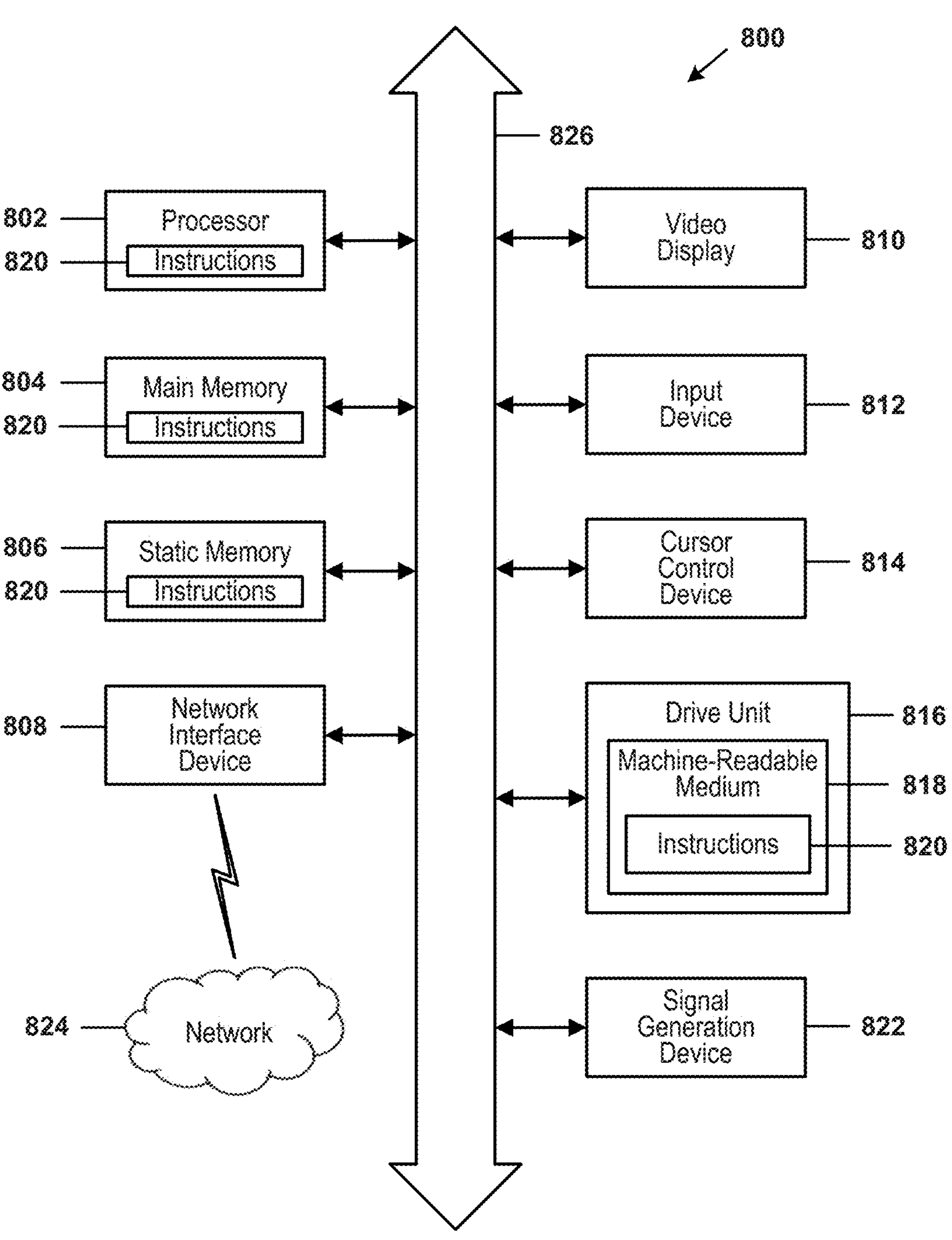
FIG. 8 illustrates a block diagram of an example general computer system.

FIG. 8 is a block diagram of an illustrative embodiment of a general computer system 800. The computer system 800 can include a set of instructions that can be executed to cause the computer system 800 to perform any one or more of the methods or computer based functions disclosed herein in FIGS. 1-7D. The computer system 800, or any portion thereof, may operate as a standalone device or may be connected, e.g., using a network or other connection, to other computer systems or peripheral devices. For example, the computer system 800 may be a computing device 302 of the developer, a computing device 314-318 of the builder, or the server/content provider 304, and may further be connected to other systems and devices via the network 312 or directly, for example, such as the server/content provider 304 being connected to the MPC database 308 and MPC rules table 310, via a network such as the network 312.

The computer system 800 may also be implemented as or incorporated into various devices, such as a personal computer (PC), a tablet PC, a personal digital assistant (PDA), a computing device or mobile device (e.g., smartphone), a palmtop computer, a laptop computer, a desktop computer, a communications device, a control system, a web appliance, or any other machine capable of executing a set of instructions (sequentially or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics-processing unit (GPU), or both. Moreover, the computer system 800 may include a main memory 804 and a static memory 806 that can communicate with each other via a bus 826. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive (or solid state) unit 816, a signal generation device 822, such as a speaker or remote control, and a network interface device 808.

In a particular embodiment or aspect, as depicted in FIG. 8, the disk drive (or solid state) unit 816 may include a computer-readable medium 818 in which one or more sets of instructions 820, e.g., software, can be embedded. Further, the instructions 820 may embody one or more of the methods or logic as described herein. In a particular embodiment or aspect, the instructions 820 may reside completely, or at least partially, within the main memory 804, the static memory 806, and/or within the processor 802 during execution by the computer system 800. The main memory 804 and the processor 802 also may include computer-readable media.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computer systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computer system processing can be constructed to implement one or more of the methods or functionality as described herein.

It is also contemplated that a computer-readable medium includes instructions 820 or receives and executes instructions 820 responsive to a propagated signal, so that a device connected to a network 824 can communicate voice, video or data over the network 824. Further, the instructions 820 may be transmitted or received over the network 824 via the network interface device 808.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment or aspect, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor.

Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Thus, an anti-monotony system and method associated with new home construction in a master-planned community have been described. Although specific example embodiments or aspects have been described, it will be evident that various modifications and changes may be made to these embodiments or aspects without departing from the broader scope of the invention. Accordingly, the specification and drawings are to be regarded in an illustrative rather than a restrictive sense. The accompanying drawings that form a part hereof, show by way of illustration, and not of limitation, specific embodiments or aspects in which the subject matter may be practiced. The embodiments or aspects illustrated are described in sufficient detail to enable those skilled in the art to practice the teachings disclosed herein. Other embodiments or aspects may be utilized and derived therefrom, such that structural and logical substitutions and changes may be made without departing from the scope of this disclosure. This Detailed Description, therefore, is not to be taken in a limiting sense, and the scope of various embodiments or aspects is defined only by the appended claims, along with the full range of equivalents to which such claims are entitled.

Such embodiments or aspects of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description The Abstract is provided to comply with 37 CFR § 1.72(b) and will allow the reader to quickly ascertain the nature and gist of the technical disclosure. It is submitted with the understanding that it will not be used to interpret or limit the scope or meaning of the claims.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description. Moreover, it is further contemplated that claims covering such different combinations can similarly stand on their own as separate example embodiments or aspects, which can be incorporated into the Detailed Description.

The invention claimed is:

1. A method of providing anti-monotony construction in a master-planned community, the method comprising:

generating a database based on processing geospatial information of the master-planned community, wherein the processing comprises identification from the geospatial information and storage in the database of at least a plurality of streets, a plurality of lots disposed on first and second sides of the streets, and neighbor lots disposed on one or more of left, right, and across sides of each of the lots, wherein identification of at least one neighbor lot disposed on an across side of a lot disposed on a first side or a second side of a street comprises: identifying a frontage of the lot on the street; performing geo-projection of the frontage across the street within a first predetermined distance; and identifying the at least one neighbor lot having a frontage that is spanned at least partially by the frontage of the lot;

receiving a request associated with construction of a new home in the master-planned community, the request including a selected lot and a selected specification including one or more architectural details associated with the new home, the selected lot being selectable from available lots of the plurality of lots for construction in the master-planned community, the selected specification including one or more architectural details being selectable from a plurality of available architectural details;

processing the request against an anti-monotony rule associated with architectural diversity of the one or more architectural details of the selected specification from architectural details of multiple lots identified from the database as being consecutive neighbors on one or more of the sides of the selected lot, the one or more of the sides and the architectural details of the multiple lots considered being identified in the anti-monotony rule, wherein processing the request against the anti-monotony rule comprises:

identifying the consecutive neighbors on the one or more of the sides of the selected lot based on a side indicator and a limit number specified in the anti-monotony rule, wherein the side indicator is capable of identifying left, right, left and right, or across sides of the selected lot, and the limit number is capable of identifying a total number of the consecutive neighbors in accordance with the side indicator;

retrieving the architectural details of the multiple lots identified as consecutive neighbors; and matching the one or more architectural details of the selected specification against the architectural details retrieved for the multiple lots identified as being consecutive neighbors based on a coincidence number of consecutive matches among the multiple lots required by the anti-monotony rule, the coincidence number being identified in the anti-monotony rule; and generating a status of approval or denial of the request based on whether at least one of the architectural details of the selected specification matches at least one of the architectural details of the multiple lots identified as being consecutive neighbors.

2. The method of claim 1, further comprising recording in the database the selected specification of the one or more architectural details and the status of approval in association with the selected lot when the architectural details of the selected specification do not match the architectural details of the multiple lots identified as being consecutive neighbors.

3. The method of claim 2, further comprising transmitting the status of approval in response to the request.

4. The method of claim 1, further comprising transmitting the status of denial when at least one of the architectural details of the selected specification matches at least one of the architectural details of the multiple lots identified as being consecutive neighbors.

5. The method according to claim 1, wherein the database comprises at least a lot identifier identifying each lot, a street identifier identifying a street associated with the lot identifier, a side identifier identifying a side of the street on which the lot is disposed, and left, right, and across neighbor lot identifiers associated with the lot identifier of each lot.

6. The method according to claim 5, wherein processing the geospatial information in generating the database comprises:

processing geospatial information of contiguous line strings that represent street segments in order to identify the plurality of streets of the master-planned community;

processing geospatial information of continuous closed polygons in order to identify the plurality of lots of the master-planned community;

performing geo-projection of the line strings of each of the streets to identify a first ordered set of lots disposed on a first side of each of the streets, and a second ordered set of lots disposed on a second side of each of the streets, and processing each lot in the first ordered set of lots and in the second ordered set of lots for each of the streets to identify neighbors on left, right, and across sides of each lot in the master-planned community.

7. The method according to claim 6, wherein processing each lot in the first ordered set of lots and in the second ordered set of lots for each of the streets comprises identifying a left neighbor lot and a right neighbor lot that are within a second predetermined distance from each lot.

8. The method according to claim 6, wherein processing each lot in the first ordered set of lots and in the second ordered set of lots for each of the streets comprises:

identifying a frontage of each lot on an associated street; and performing geo-projection of the frontage of each lot across the associated street within the first predetermined distance from the frontage of each lot; and identifying one or more across neighbor lots each having a frontage that is spanned at least partially by the frontage of each lot.

9. A system to provide anti-monotony construction in a master-planned community, the system comprising:

a computing device;

a non-transitory memory storing instructions that, when executed by the computing device, cause the computing device to execute operations comprising:

generating a database based on processing geospatial information of the master-planned community, wherein the processing comprises identification from the geospatial information and storage in the database of at least a plurality of streets, a plurality of lots disposed on first and second sides of the streets, neighbor lots disposed on one or more of left, right, and across sides of each of the lots, and architectural details of each of the lots, wherein identification of at least one neighbor lot disposed on an across side of a lot disposed on a first side or a second side of a street comprises: identifying a frontage of the lot on the street; performing geo-projection of the frontage across the street within a first predetermined distance; and identifying the at least one neighbor lot having a frontage that is spanned at least partially by the frontage of the lot;

receiving a request associated with construction of a new home in the master-planned community, the request including a selected lot and a selected specification including one or more architectural details associated with the new home, the selected lot being selectable from available lots of the plurality of lots for construction in the master-planned community, the selected specification including one or more architectural details being selectable from a plurality of available architectural details;

processing the request against an anti-monotony rule associated with architectural diversity of the one or more architectural details of the selected specification from architectural details of multiple lots identified from the database as being consecutive neighbors on one or more of the sides of the selected lot, the one or more of the sides and the architectural details of the multiple lots considered being identified in the anti-monotony rule, wherein processing the request against the anti-monotony rule comprises:

identifying the consecutive neighbors on the one or more of the sides of the selected lot based on a side indicator and a limit number specified in the anti-monotony rule, wherein the side indicator is capable of identifying left, right, left and right, or across sides of the selected lot, and the limit number is capable of identifying a total number of the consecutive neighbors in accordance with the side indicator;

retrieving the architectural details of the multiple lots identified as consecutive neighbors; and matching the one or more architectural details of the selected specification against the architectural details retrieved for the multiple lots identified as being consecutive neighbors based on a coincidence number of consecutive matches among the multiple lots required by the anti-monotony rule, the coincidence number being identified in the anti-monotony rule; and generating a status of approval or denial of the request based on whether at least one of the architectural details of the selected specification matches at least one of the architectural details of the multiple lots identified as being consecutive neighbors.

10. The system of claim 9, the operations further comprising recording in the database the selected specification of the one or more architectural details and the status of approval in association with the selected lot when the architectural details of the selected specification do not match the architectural details of the multiple lots identified as being consecutive neighbors.

11. The system of claim 10, the operations further comprising transmitting the status of approval in response to the request.

12. The system of claim 9, the operations further comprising transmitting the status of denial when at least one of the architectural details of the selected specification matches at least one of the architectural details of the multiple lots identified as being consecutive neighbors.

13. The system according to claim 9, wherein the database comprises at least a lot identifier identifying each lot, a street identifier identifying a street associated with the lot identifier, a side identifier identifying a side of the street on which the lot is disposed, and left, right, and across neighbor lot identifiers associated with the lot identifier of each lot.

14. The system according to claim 13, wherein operations associated with processing the geospatial information in generating the database comprise:

processing geospatial information of contiguous line strings that represent street segments in order to identify the plurality of streets of the master-planned community;

processing geospatial information of continuous closed polygons to identify lots of the master-planned community;

performing geo-projection of the line strings of each of the streets to identify a first ordered set of lots disposed on a first side of each of the streets, and a second ordered set of lots disposed on a second side of each of the streets; and processing each lot in the first ordered set of lots and in the second ordered set of lots for each of the streets to determine neighbors on left, right, and across sides of each lot in the master-planned community.

15. The system according to claim 14, wherein operations associated with processing each lot in the first ordered set of lots and in the second ordered set of lots for each of the streets comprise identifying a left neighbor lot and a right neighbor lot that are within a second predetermined distance from each lot.

16. The system according to claim 14, wherein operations associated with processing each lot in the first ordered set of lots and in the second ordered set of lots for each of the streets comprise:

identifying a frontage of each lot on an associated street; and performing geo-projection of the frontage of each lot across the associated street within the first predetermined distance from the frontage of each lot; and identifying one or more across neighbor lots each having a frontage that is spanned at least partially by the frontage of each lot.

* * * * *